Oct. 7, 1924.
G. RITTER
SATURATING APPARATUS
Filed Aug. 31, 1922  5 Sheets-Sheet 3
FIG. III.
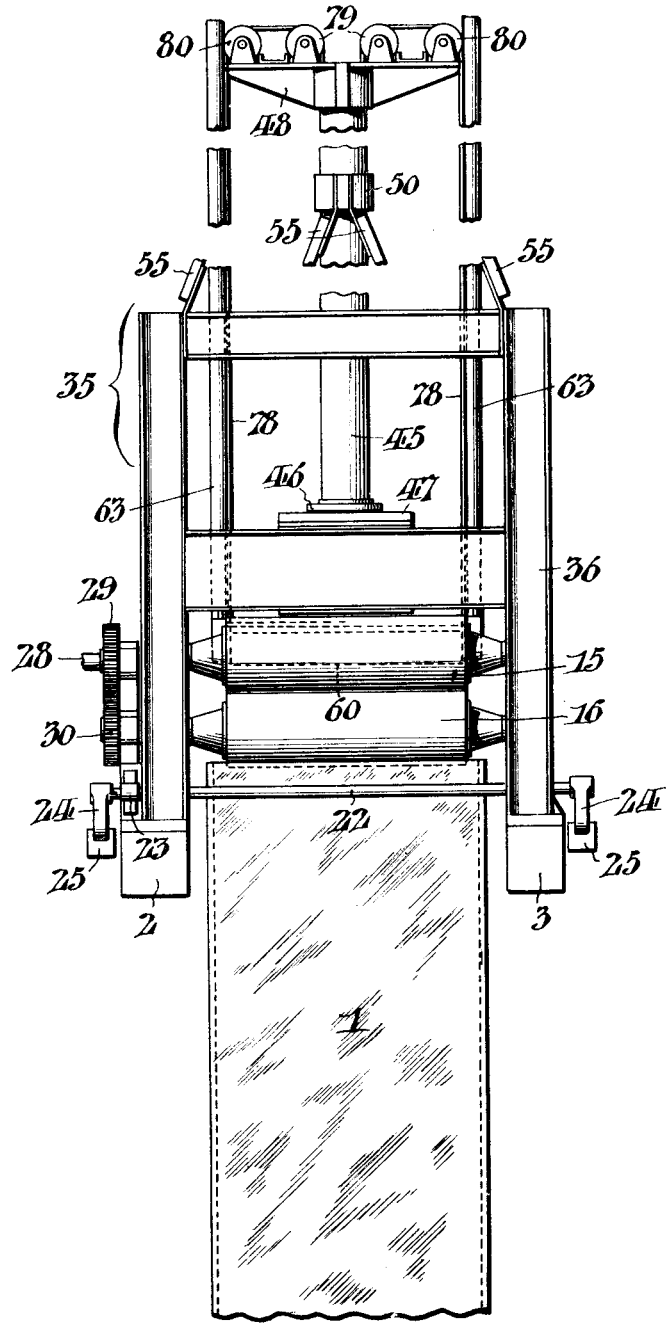
WITNESSES:
John C. Bergner.
Alfred E. Ischinger.
INVENTOR:
George Ritter,
BY Fraley Paul
ATTORNEYS.

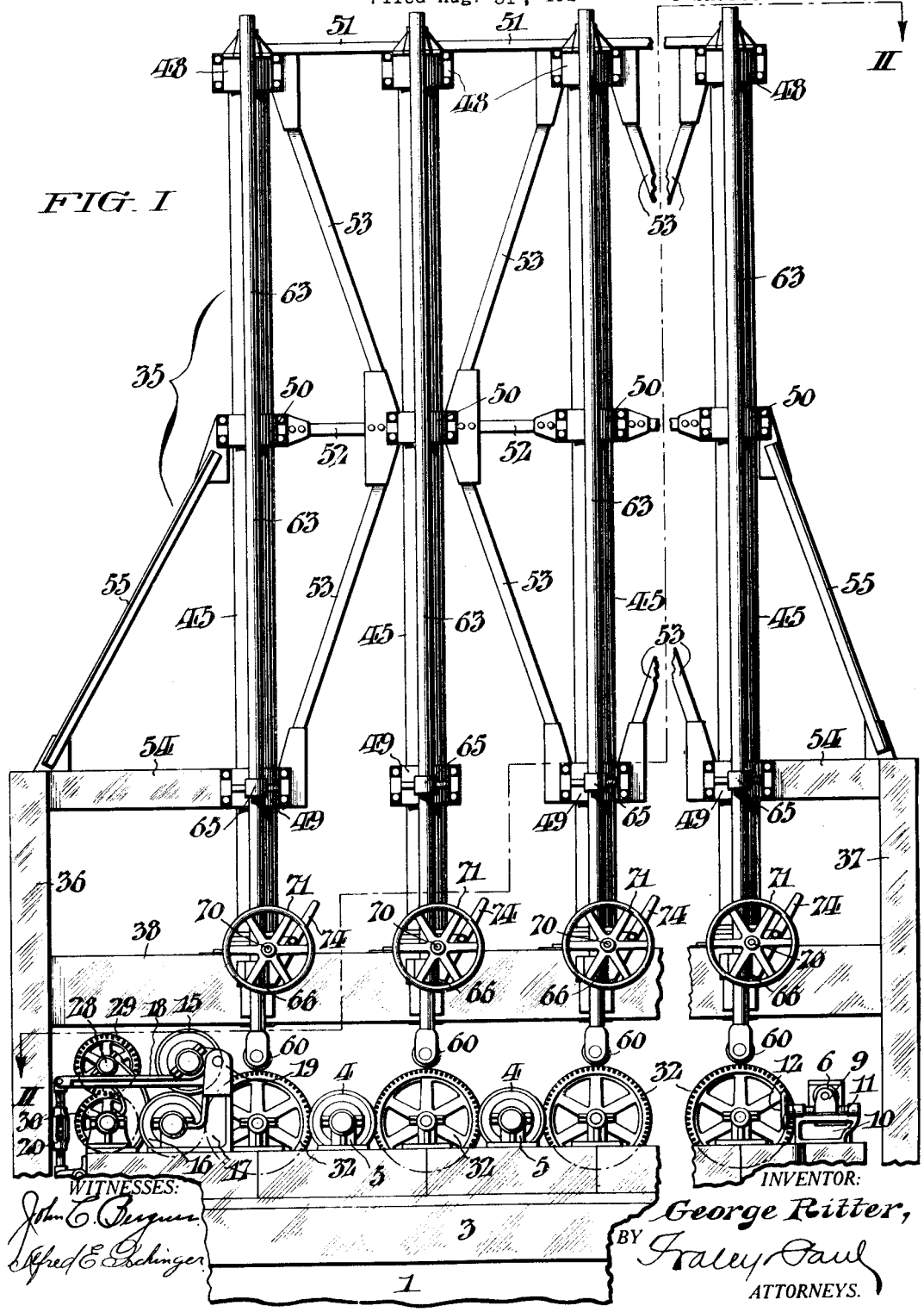

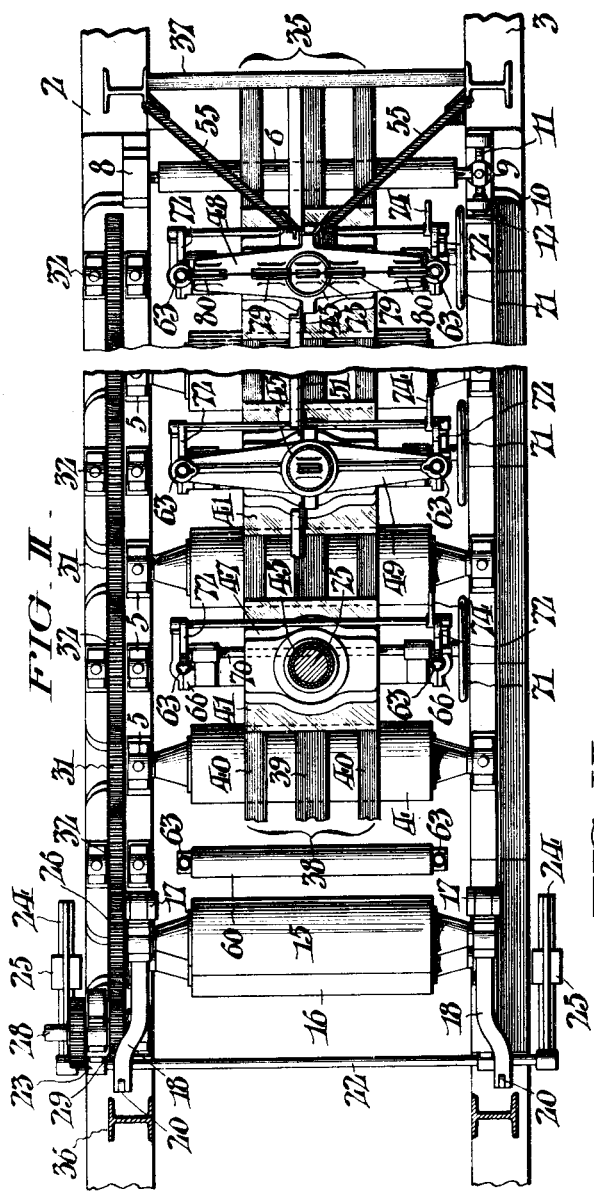

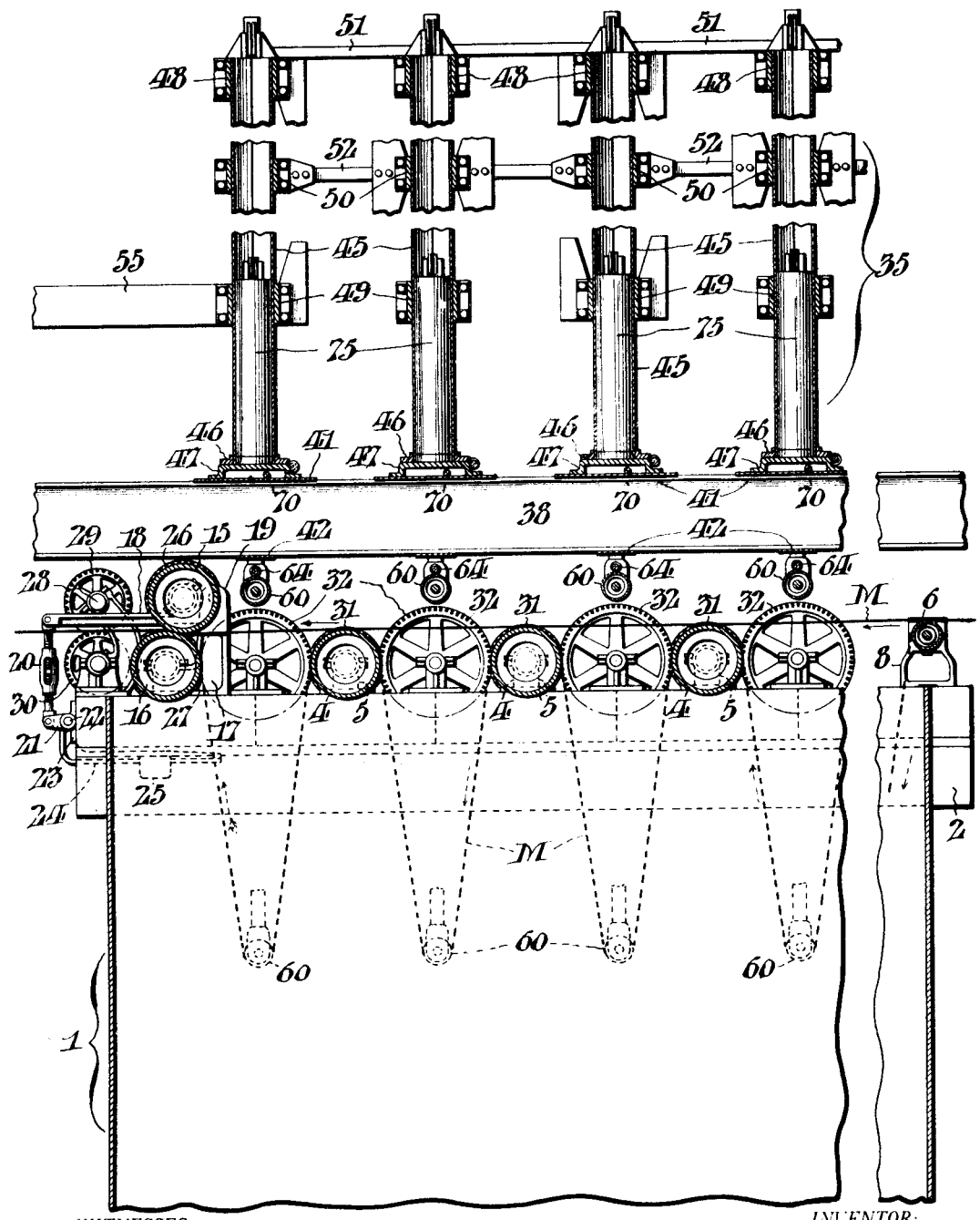

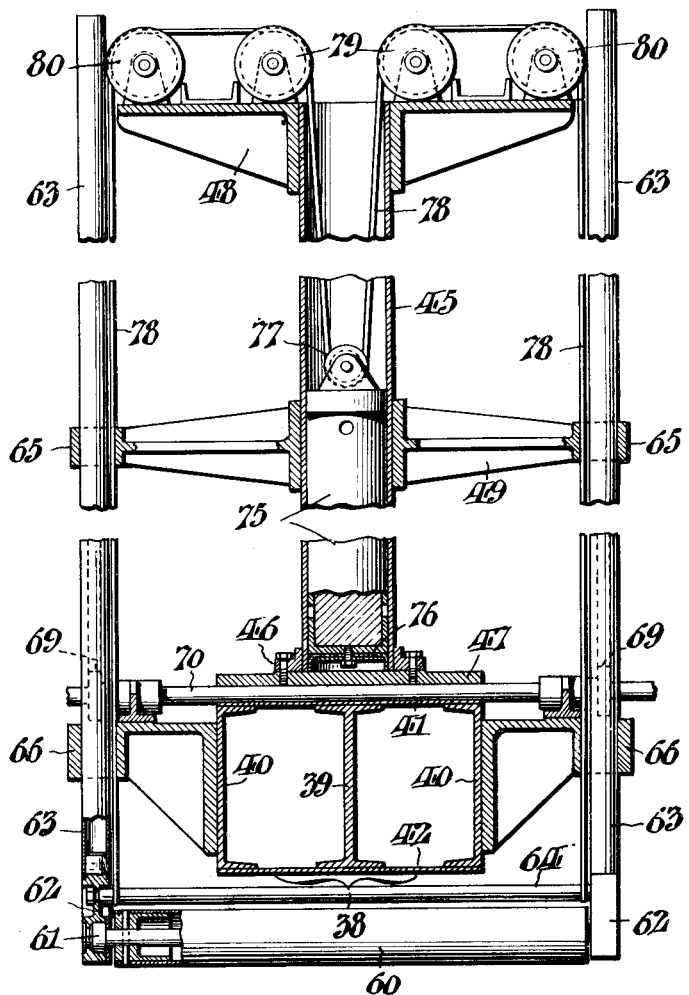

UNITED STATES PATENT OFFICE.

GEORGE RITTER, OF WOODBRIDGE, NEW JERSEY, ASSIGNOR TO THE BARBER ASPHALT COMPANY, OF PHILADELPHIA, PENNSYLVANIA, A CORPORATION OF WEST VIRGINIA.

SATURATING APPARATUS.

Application filed August 31, 1922. Serial No. 585,417.

*To all whom it may concern:*

Be it known that I, GEORGE RITTER, a citizen of the United States, residing at Woodbridge, county of Middlesex, and State of New Jersey, have invented certain new and useful Improvements in Saturating Apparatus, whereof the following is a specification, reference being had to the accompanying drawings.

My invention relates to improvements in saturating apparatus useful in connection with impregnating or saturating materials in web or sheet form such as employed for example in the manufacture of prepared roofings.

Apparatus of this character usually comprises a tank for the saturating solution, a set of main guide rolls arranged in spaced relation, and a cooperative set of auxiliary guide rolls capable of being lowered in the intervals between the main guide rolls to determine a zigzag path of movement for the sheet material in the course of its progression through the tank while immersed therein. In machines heretofore available considerable difficulty was experienced in starting the sheet material through the apparatus which necessitated the threading thereof between and about the guide rolls of the two series. The sticky nature of the solutions often employed in saturating processes not only rendered the operation of threading tedious but extremely disagreeable as well.

The primary object of my invention is to overcome the difficulties above pointed out and this desideratum I attain by providing for the elevation of the auxiliary rolls to a level clear above the main guide rolls so that said rolls are entirely accessible whereby the sheet material may be drawn straight across them and the movable guide rolls subsequently lowered to the desired extent within the tank. I further facilitate the starting of the sheet or web by disposing the drawing instrumentalities wholly at one side of the apparatus so that the other is entirely free of obstructions which would render access to the rollers extremely difficult.

Other objects and attendant advantages of my invention will become readily apparent from the detailed description which follows, while its scope is clearly manifested in the appended claims.

Referring to the drawings,

Fig. I is a side elevation of a saturating apparatus conveniently embodying my invention, portions thereof being broken away for convenience of illustration.

Fig. II is a view partly in plan and partly in horizontal section taken as indicated by the arrows II—II in Fig. I.

Fig. III is an end elevation of the structure viewed from the left of Figs. I and II.

Fig. IV is a central longitudinal section of the same.

Fig. V is a broken cross section drawn to an enlarged scale of the super-structure supporting the auxiliary guide rollers.

Fig. VI is a detail illustration partly in elevation and partly in section showing the mechanism whereby the auxiliary guide rollers may be manually raised and lowered.

Fig. VII is a detail view showing the construction of the swivel bearing employed in connection with mounting of an aligning roll over which the sheet material to be saturated is led into the tank.

As herein shown a saturating apparatus typical of my invention comprises an elongated tank 1 which may be supported in any convenient manner above ground or sunk below the floor level as may be desired or found most convenient. Extending along the longitudinal sides of the tank adjacent the top of the latter are beams 2—3 which support crosswise of the tank and between them, a series of main guide rollers 4—4, the trunnions of said rollers being free to rotate in companion journal bearings 5 jointly supported by the beams. Preparatory to passing over the rollers 4—4, the sheet material to be impregnated or saturated, shown at M, is led over what I term for convenience, an aligning roll, the same being designated by the numeral 6 in the drawings.

In order that this roll 6 may be angularly adjusted so that the sheet material may be trued for proper guidance through the apparatus, one end of the same is mounted in a swivel bearing 7, see Fig. VII which is hung in a bracket 8 appropriately supported upon the beam 2 at the far side of the tank, Fig. I, while the other trunnion of said rollers is journaled in a bearing 9 slidable with an adjusting screw 11 which is rotatable in lugs of the bracket 10 under manual actuation of a hand wheel 12, see Fig. II.

Progression of the sheet material through the apparatus is effected by a pair of cooperative pull rolls 15—16, the latter of the two being journaled in bearings 17 in the manner similar to the mounting of the guide rolls 4—4. The uppermost pull roll 15 is supported by arms 18 swingable about pivots 19 in integral upstanding extensions of the bearings 17. Said arms 18 are coupled, by means of adjustable links 20, to levers 21 secured on a rock shaft 22, which is supported in bearings 23 bolted or otherwise secured to the beams 2—3 and which, at its opposite ends, carries treadle levers 24 with adjustable counterweights shown at 25 in Figs. II and IV. By shifting the weights 25 along the levers 24 the roll 15 may be counterbalanced more or less so that the pressure exerted thereby upon the travelling sheet or web M may be varied to extract, by pressure, correspondingly different proportions of the saturating solution absorbed by the sheet in its passage through the tank 1. The roll 15 may be raised entirely clear of its companion 16 when starting the sheet through the apparatus, by application of foot pressure on either one or the other of the treadle levers 24. The rolls 15 and 16, in order to be positively driven at synchronous speeds have secured to them gears 26—27 respectively, said gears intermeshing, and the latter driven from a power shaft 28 through the medium of interposed gears 29—30. The main guide rollers 4 are in turn coordinated for positive driving by virtue of a transmission system including gears 31 directly secured to the rollers, and a series of intervening idlers 32, the train deriving its motion through intermeshing of the first of these idlers (the one at the extreme left in Fig. IV) with the gear 27 of the lower pull roll 16. It is to be especially observed that this gear train is located at the far side of the apparatus or that side remote from the observer in Figs. I and IV as a result of which the main rolls are rendered free of access from the front of the apparatus.

The tank 1 is surmounted by a superstructure 35 comprising transverse end frames 36, 37 which span the longitudinal beams 2—3 previously referred to at opposite ends of the tank 1 and serve to support a bridge beam 38. Said beam, 38, it will be noted, extends centrally over the tank 1 in a direction longitudinally of the apparatus, and furthermore that the same is of multipartite construction, see Fig. V, with a medial I beam 39 and two relatively spaced side channel support of a series of tubular columns 45 which have flanges 46 at their lower ends whereby they are secured to base plates 47 bolted to the beam 38. Secured to each of the columns 45 at their tops is a cross arm 48; at a region adjacent the lower end a second cross arm 49; and at a region intermediate the two arms is clamped a collar 50. The upper cross arms 48 and the collar 50 are joined by horizontal tie rods 51—52 respectively, while the upper and lower cross arms of alternate columns are tied by angularly disposed struts 53 to the clamp collars 50 of intermediate columns. The superstructure is further strengthened by connecting the clamp collars 50 and lower cross arms 49 of the end columns as shown at 54 and 55 respectively.

The framework organized, as just described, is provided to serve as a support from which the auxiliary rolls which cooperate with the main rolls in guiding the web or sheet through the apparatus are suspended with provision for being raised and lowered in the tank 1. These auxiliary rollers are indicated by the numeral 60 and each is shown with its trunnions journaled for free rotation in ball bearings 61 mounted in shanked fittings 62 which are secured to the lower ends of vertically disposed tubular rods 63. The two rods 63 of each roller 60 are joined by a spacer bar 64 extending transversely of the apparatus between the fittings 62 as best shown in Fig. V. The rods 63 are guided in bosses 65 at the ends of the lower cross arms 49 of the columns, and also in brackets 66 bolted to the sides of the bridging beam 38. Secured within the hollows of each pair of the rods 63 adjacent the lower ends of the same are racks 67, see Fig. VI, having gear teeth 68 for intermeshing with pinions 69. Said pinions 69 are secured in proper spaced relation upon a shaft 70 in bearings bolted or otherwise fixed upon the brackets 66 aforementioned. To each shaft 70, at the operating side of the apparatus (that foremost in Fig. I) is secured a hand wheel 71 by rotation of which the rods 70 and the roller 60 suspended from them may be raised and lowered manually. As a means for maintaining the rods 63 locked in adjusted positions. I have provided dogs 72 for cooperation with the teeth of the pinions 69. These dogs 72 are normally maintained in contact with the pinions 66 under pressure exerted by springs 73, and may be swung into and out of engagement with said pinions in opposition to the pull of the spring 73 by means of the grips or handles 74 provided for that purpose.

auxiliary rollers 60 may also be accomplished automatically, I have provided means as follows:

More especially from Fig. V it will be observed that the columns 45 are employed as cylinders for the guidance of pistons 75 which for fluid tightness have cup washers 76 secured to their lower ends. The pistons 75 serve in an additional capacity as counterpoises for the auxiliary rollers 60 and the parts which support them, and are accordingly made hollow and filled with a metal high in specific gravity, preferably lead. To the upper end of each piston 75 is mounted a pulley 77 beneath which a belt or cable 78 passes. After extending upwardly through the column 45, the ends of said cable are guided horizontally and outwardly in opposite directions over pulleys 79—80 upon the top of the upper cross arm 48 supported by each of the columns 45, and from the pulleys 80 down to a point of attachment to the tie-bar 64, connections for the ends of the cables being preferably made directly adjacent the ends of said tie-bar so that all tendency to binding of the rods 63 in their guide bearings 65, 66 during the operations of raising and lowering the rollers 60 is obviated. The pistons 75 may be operated by fluid pressure which may be air or steam admitted to the lower ends of the columns 45, the admission and exhaust of the motive fluid being controlled through a suitable valve mechanism not shown. Such a valve system may be provided for each of the columns so that the rolls 60 may be individually raised and lowered or a single master valve system may be installed to control the several cylinders simultaneously as may be required by exigencies of practice. The weight of the pistons 75 is slightly in excess of the auxiliary rollers 60 and the parts which directly support them so that said rollers are raised simply by permitting exhaust of the air from the lower ends of the columns.

In operation, the sheet or web M to be saturated or impregnated is first passed over the aligning roll 6, thence across the tops of the main guide rollers 4 and finally between the pull rolls 15—16 from whence it may be directed to other apparatus for performance of subsequent operations upon it. From Fig. IV it will be especially noted that when in their upper position the auxiliary rolls 60 rest at a level well above the tops of the main rollers 4 so that in initiating the passage of the sheet M the same may be drawn horizontally between the aligning roll 6 and the pull rolls 15 and 16 without interference from the auxiliary rollers 60 and without necessitating tedious threading as required in apparatus heretofore designed for the same purpose. The fact that the gear trains by which motion of the main guide apparatus and that the super-structure is supported wholly from standards at the ends of the apparatus, free access is had to said main guide rollers in initiating the passage of the sheet or web M through the machine. After the sheet or web M has been positioned as just explained, the auxiliary rollers 60 are lowered by the means already described so as to carry said web down into the solution in the tank 1. The level to which the rolls 60 are lowered may be individually regulated either manually by rotation of the hand wheels 71, or by pneumatic operation of the counterpoises 75 and locked against further movement in the desired positions by engagement of the dogs 72 with the pinions 69. Immediately upon starting the apparatus in motion, the aligning roll 6 may be properly adjusted by means of the hand wheel 12 so that the web M runs true to the avoidance of any wrinkling or buckling which might otherwise result.

Having thus described my invention I claim:

1. A saturating apparatus including a tank for the saturating solution, two separate sets of guide rollers for determining a zigzag course of sheet material through the solution in the tank, means co-ordinating one of said sets of rollers for positive driving, and means whereby the other set of rollers may be moved to completely clear the coordinated set in affording an interspace through which the sheet material may be drawn in a straight line thereby to obviate necessity for threading the sheet material about the guide rollers in initiating its starting in the apparatus.

2. A saturating apparatus including a tank for the saturating solution, two separate sets of guide rollers for determining a zigzag course of sheet material through the solution in the tank, means co-ordinating one of said sets of rollers for positive driving, and means whereby the other set of rollers may be moved to completely clear the coordinated set at a level above the surface of the liquor.

3. A saturating apparatus including a tank for the saturating solution, a main set of guide rollers arranged in spaced relation over the tank, means coordinating said set of rollers for positive driving, a set of auxiliary rollers normally submerged in the saturating solution and cooperating with the main guide rollers in determining a zigzag course of sheet material through the solution, and means whereby the auxiliary guide rollers may be elevated in the intervals between the main guide rollers to a level clear of the latter to afford an interspace through which the sheet material can be drawn in horizontally thereby to obviate necessity for rollers in initiating its starting in the apparatus.

4. A saturating apparatus including a tank for the saturating solution, a set of main guide rollers arranged in spaced relation over the tank, means coordinating positive rotation of said rollers, a set of auxiliary rollers normally submerged in the saturating solution and cooperating with the main guide rollers in determining a zigzag course of sheet material through the solution, a pair of pull rolls stationed at one end of the tank for drawing the sheet material through the apparatus, an aligning roll at the opposite end of the tank over which the sheet material passes into the apparatus, and means whereby the auxiliary rollers may be elevated in the intervals between the main rollers to a level clear of the latter to afford an interspace through which the sheet material can be drawn horizontally between said pull rolls and the aligning roll thereby to obviate necessity for threading the sheet material about the guide rollers in initiating its starting in the apparatus.

5. A saturating apparatus including a tank for the saturating solution, a set of main guide rollers arranged in spaced relation over the tank, a drive system whereby said rollers are individually rotated to assist in progressing sheet material through the apparatus, the elements of said drive system being disposed wholly upon one side of said apparatus so as to leave the opposite side unobstructed for ready access to the rollers, a set of auxiliary rollers normally submerged in the saturating solution for cooperating with the main guide rollers in determining a zigzag course of the sheet material through the solution, and means whereby the auxiliary rollers may be elevated to a level clear of the main guide rollers to afford an interspace open from the unobstructed side of the apparatus through which the sheet material can be drawn horizontally thereby to obviate necessity for threading of the latter about the guide rollers in initiating its starting in the apparatus.

6. A saturating apparatus including a tank for the saturating solution, a main set of guide rollers arranged in spaced relation over the tank, means coordinating positive rotation of said rollers, a set of auxiliary rollers normally submerged in the saturating solution and cooperating with the main guide rollers in determining a zigzag course of sheet material through the solution, and means whereby the auxiliary guide rollers may be elevated in the intervals between the main guide rollers to a level clear of the latter to afford an interspace through which the sheet material can be drawn in horizontally, thereby to obviate necessity for threading the sheet material about the guide rollers in initiating its starting in the apparatus, said elevating means being supported by a superstructure sustained at an elevation by standards at opposite ends of the tank only so that direct access may be had laterally from the side of the apparatus to the interspace afforded as aforesaid.

7. A saturating apparatus including a tank for the saturating solution, a set of main guide rollers arranged in spaced relation over the tank, means coordinating positive rotation of said rollers, a set of auxiliary rollers normally submerged in the saturating solution for cooperation with the main guide rollers in determining a zigzag course of sheet material in passing through the solution, a superstructure supported at an elevation above the tank solely by standards at opposite ends of said tank so that direct access may be had laterally from a side of the apparatus to the main rollers, said superstructure comprising guides for slide rods whereto the auxiliary rollers are hung, and means operative upon the slide rods for raising the auxiliary rollers through the intervals between the main rollers to a level clear of the latter to afford an interspace through which the material can be drawn horizontally, thereby obviating the necessity for threading the sheet material about the guide rolls in initiating its starting in the apparatus.

In testimony whereof, I have hereunto signed my name at Maurer, N. J., this 26th day of August, 1922.

GEORGE RITTER.

Witnesses:
CHARLES HOWDEN HILL,
JOHN JOSEPH TRIGGS.